United States Patent
Kondrashov et al.

(10) Patent No.: US 12,444,076 B2
(45) Date of Patent: Oct. 14, 2025

(54) TRIGGERING A HEAD-POSE DEPENDENT ACTION

(71) Applicant: GN Hearing A/S, Ballerup (DK)

(72) Inventors: Kirill Kondrashov, Helmond 't Hout (NL); Qi Yang, Chicago, IL (US)

(73) Assignee: GN Hearing A/S, Ballerup (DK)

( * ) Notice: Subject to any disclaimer, the term of this patent is extended or adjusted under 35 U.S.C. 154(b) by 287 days.

(21) Appl. No.: 17/485,165

(22) Filed: Sep. 24, 2021

(65) Prior Publication Data
US 2023/0102851 A1    Mar. 30, 2023

(51) Int. Cl.
*G06T 7/73* (2017.01)
*G06F 18/214* (2023.01)
*G06T 7/246* (2017.01)
*G06T 7/277* (2017.01)
*G06V 40/16* (2022.01)
(Continued)

(52) U.S. Cl.
CPC .............. *G06T 7/73* (2017.01); *G06F 18/214* (2023.01); *G06T 7/246* (2017.01); *G06T 7/277* (2017.01); *G06V 40/161* (2022.01); *H04N 23/611* (2023.01); *H04R 25/70* (2013.01); *G06T 2207/10016* (2013.01); *G06T 2207/30201* (2013.01)

(58) Field of Classification Search
CPC ........... G06T 7/73; G06T 7/246; G06T 7/277; G06T 2207/10016; G06T 2207/30201; G06V 40/161; G06V 40/168; G06V 10/62; G06V 10/757; G06V 40/165; H04N 23/611; H04R 25/70
See application file for complete search history.

(56) References Cited

U.S. PATENT DOCUMENTS

| | | | |
|---|---|---|---|
| 6,272,231 B1 * | 8/2001 | Maurer ................ | G06V 10/449 382/209 |
| 2006/0204013 A1 * | 9/2006 | Hannibal ............... | H04R 25/70 381/60 |
| 2010/0296664 A1 | 11/2010 | Burgett et al. | |

(Continued)

FOREIGN PATENT DOCUMENTS

WO    WO 2019/145411    8/2019

OTHER PUBLICATIONS

Wikipedia Entry: "Kalman filter", URL: https://en.wikipedia.org/wiki/Kalman_filter, accessed Sep. 16, 2021.

(Continued)

*Primary Examiner* — Nay A Maung
*Assistant Examiner* — Dustin Bilodeau
(74) *Attorney, Agent, or Firm* — Vista IP Law Group, LLP

(57) ABSTRACT

Disclosed herein is an apparatus comprising a camera and a processing unit operatively coupled to the camera, wherein the processing unit is configured to: receive a sequence of images captured by the camera; process a first image of the received sequence of images to compute respective likelihoods of each of a plurality of predetermined facial features being visible in the first image; compute, from the computed likelihoods, a probability that the first image depicts a predetermined first side of a human head; responsive to at least the computed probability exceeding the predetermined detection probability, trigger performance of a predetermined action.

20 Claims, 4 Drawing Sheets

(51) Int. Cl.
*H04N 23/611* (2023.01)
*H04R 25/00* (2006.01)

(56) References Cited

U.S. PATENT DOCUMENTS

| | | |
|---|---|---|
| 2011/0164128 A1 | 7/2011 | Burgett et al. |
| 2012/0120269 A1* | 5/2012 | Capata ................ G06F 18/2148 |
| | | 348/222.1 |
| 2013/0121496 A1 | 5/2013 | Boretzki |
| 2017/0163866 A1* | 6/2017 | Johnson .................. G06F 3/011 |
| 2020/0285834 A1 | 9/2020 | Ishii |
| 2021/0056291 A1* | 2/2021 | Doublet ................ G06V 40/18 |
| 2021/0089773 A1 | 3/2021 | Yang et al. |
| 2021/0165999 A1 | 6/2021 | Mirbach et al. |
| 2021/0185223 A1* | 6/2021 | Hempel .................... G06T 7/55 |

OTHER PUBLICATIONS

Zhou, Yijun et al., "WHENet: Real-time Fine-Grained Estimation for Wide Range Head Pose", IC Lab, Copyright 2020.
Wang, H., et al., "Hybrid Coarse-Fine Classification for Head Pose Estimation", School of Information Science and Technology, Dalian Maritime University, accessed Oct. 2019.
Xiao, B., et al., "Simple Baselines for Human Pose Estimation and Tracking", accessed Aug. 2018.

\* cited by examiner

TRIGGERING A HEAD-POSE DEPENDENT ACTION

FIELD

The present disclosure relates to an apparatus and a method for triggering performance of a head-pose dependent action.

BACKGROUND

There is a general need for efficiently performing computer-implemented or computer-controlled actions responsive to detected head poses.

For example, in certain applications, it is desirable to control a camera to automatically record one or more images of a predetermined view of a human's head, e.g., a lateral side view such that an ear of the subject may be visible in the captured image.

Various methods for head pose detection are known.

Some prior art methods rely on depth information, e.g., as obtained from multi-ocular cameras or depth cameras. However, it is desirable to provide a method that does not require depth information and may be performed based on 2D images captured by a monocular camera.

Further examples of prior art methods are described in the articles "Hybrid Coarse-Fine Classification For Head Pose Estimation" by Haofan Wang et al. and "WHENet: Real-time Fine-Grained Estimation for Wide Range Head Pose" by Yijun Zhou et al. These methods involve the use of trained neural networks, e.g. so as to classify images into respective angle bins indicative of the 3D pose of the human head depicted in the images. Hence, these methods are complex and require the creation of training data in order to train the neural network.

Another prior art method is described in the article "Simple Baselines for Human Pose Estimation and Tracking" by Bin Xiao et al. This article is concerned with the estimation of human poses and the tracking of poses across multiple frames of a video stream. The authors of this prior art document have suggested using an Object Keypoint Similarity to track poses across frames of a video. However, this requires detection or definition of some reference pose, which might differ per individual.

Accordingly, there remains a need for a method that solves one or more of the problems of the prior art methods or at least provides an alternative.

SUMMARY

Disclosed herein are embodiments of an apparatus comprising a camera and a processing unit operatively coupled to the camera, wherein the processing unit is configured to:
receive a sequence of images captured by the camera;
process a first image of the received sequence of images to compute respective likelihoods of each of a plurality of predetermined facial features being visible in the first image;
compute, from the computed likelihoods, a probability that the first image depicts a predetermined first side of a human head;
responsive to at least the computed probability exceeding the predetermined detection probability, trigger performance of a predetermined action.

Embodiments of the apparatus and method disclosed herein provide a robust, yet computationally efficient triggering of a head-pose dependent action.

Embodiments of the apparatus and method disclosed herein do not rely on depth information and may be performed based on images captured by a monocular camera, e.g., a webcam, a laptop camera, a front-facing camera of a mobile phone, etc. It will be appreciated, however, that some embodiments of the apparatus may use depth information or include a multi-ocular camera, e.g., to further increase the reliability of the process.

At least some embodiments of the apparatus and method disclosed herein may be performed in real-time, even with a device or by a computing environment having limited computational resources, e.g., by a mobile phone, a web-application etc.

At least some embodiments of the apparatus and method disclosed herein do not require training of a machine-learning system that outputs values of the angle of the head/a pose, i.e., there is no need for the collection of large amounts of training data for the detection of accurate angles. Similarly, embodiments of the apparatus and method disclosed herein are subject-independent, as they do not rely on an a priori definition of a reference pose.

Yet further, at least some embodiments of the apparatus and method disclosed herein only involve few tunable parameters, thus rendering its implementation and configuration relatively simple.

The predetermined facial features may be predetermined anatomical features or other predetermined characteristic and visually recognizable points on a human head. Examples of predetermined facial features include a tip of a nose, a corner of an eye, a corner of a mouth, an attachment point of an ear, a point on an earlobe, etc.

Computing the likelihoods of each of a plurality of predetermined facial features being visible in the first image may e.g., be performed by performing a feature detection process for detecting each of the plurality of predetermined facial features in the first image and computing respective confidence levels of detection for each of the plurality of facial features. Detecting a facial feature with high confidence corresponds to a high likelihood of detection. Accordingly, the confidence levels may be directly used as likelihoods, or the likelihoods may at least be derived from the confidence levels, e.g., by suitable scaling. Each confidence level and/or likelihood may e.g., be expressed as a number between 0 and 1 where a value of 1 may correspond to detection with certainty and a value of 0 may correspond to no detection.

In some embodiments, the probability that the first image depicts a predetermined first side of a human head is computed from the computed likelihoods only, i.e. without requiring processing of landmark coordinates and without comparing the landmark coordinates with a reference poses, etc. Accordingly, the process is robust and computationally efficient.

The apparatus may utilize existing libraries or methods for detecting facial features, such as the output of pose estimation libraries such as OpenPose or PoseNet which provide facial features, also referred to as landmark points, keypoints or simply landmarks, in captured images. At least some existing processes already provide confidence levels of detection as one of the outputs.

In some embodiments, the plurality of predetermined facial features includes at least three predetermined facial features. The at least three predetermined facial features may be facial features of three different sides of a human head. In particular, in some embodiments, the predetermined facial features include a first facial feature of said first side of a human head, a second facial feature of a second side of a human head, the second side being opposite the first side, and a third facial feature of a third side of the human head, the third side being different from the first and second sides.

In particular, the first side may be one lateral side of a human head and the second side may be the other lateral side a human head, opposite the first side, i.e., the first and second sides may be the right and left sides of the human head, respectively, or vice versa, i.e. the sides including the ears. The third side may be a front side of the human head, i.e., the side including the eyes, nose and mouth.

The first facial feature may be chosen such that it is visible in a side view of the human head seen when facing the first side, but not visible in a side view of the human head seen when facing the second side of the human head, opposite the first side. The first facial feature may be selected such that it is also visible on a side view of the human head seen when facing the third side. Similarly, the second facial feature may be chosen such that it is visible in a side view of the human head seen when facing the second side, but not visible in a side view of the human head seen when facing the first side of the human head. The second facial feature may be selected such that it is also visible on a side view of the human head seen when facing the third side. Finally, the third facial feature may be chosen such that it is visible in a side view of the human head seen when facing the third side. The third facial feature may be selected such that it is also visible on a side view of the human head seen when facing the first side and/or on a side view of the human head seen when facing the second side. In particular, the first facial feature may be a feature of a first ear of the human head, e.g., a landmark point on a first earlobe, an attachment point of the first ear, etc. The second facial feature may be a feature of a second ear, opposite the first ear, e.g., a landmark point on a second earlobe, an attachment point of the second ear, etc. The third facial feature may be a landmark point of the nose, e.g., a tip of the nose, which is also visible on a lateral side view of the human head.

Accordingly, the probability that the first image depicts the first side of a human head may be determined from the likelihoods of the three facial features being visible in the first image. For example, a high likelihood of the first facial feature having been detected in the first image combined with a low likelihood of the second facial feature having been detected in the first image, optionally combined with a high likelihood of the third feature having been detected in the first image, indicates a high probability that the first image depicts the first side of a human head. Accordingly, computing the probability does not require the actual coordinates of the first, second and third facial features to be determined or compared to a model of the human head, thereby providing a computationally efficient and robust detection process.

It will be appreciated that the computation of the probability may be based on more than three features, e.g., more than one feature on the first side of the head and/or more than one feature on the second side of the head and/or more than one feature on the third side of the head.

In some embodiments, the processing unit is further configured to:
  process one or more images of the sequence of images to compute a stability parameter indicative of a stability of the captured images over time;
  determine whether the computed probability exceeds a predetermined detection probability and whether the computed stability parameter fulfills a predetermined stability condition;
  and wherein the processing unit is configured to perform the triggering of the performance of the predetermined action responsive to the computed probability exceeding the predetermined detection probability and the computed stability parameter fulfilling the predetermined stability condition.

Accordingly, in some embodiments, an apparatus comprises a camera and a processing unit operatively coupled to the camera. The processing unit is configured to:
  receive a sequence of images captured by the camera;
  process a first image of the received sequence of images to detect respective likelihoods of each of at least three predetermined facial features being visible in the first image;
  compute, from the computed likelihoods, a probability that the first image depicts a predetermined first side of a human head;
  process one or more images of the sequence of images to compute a stability parameter indicative of a stability of the captured images over time;
  determine whether the computed probability exceeds a predetermined detection probability and whether the computed stability parameter fulfills a predetermined stability condition;
  responsive to the computed probability exceeding the predetermined detection probability and the computed stability parameter fulfilling the predetermined stability condition, triggering performance of a predetermined action.

Basing the triggering of the action on a computed stability parameter avoids actions being taken in response to blurry or out-of-focus images, thus increasing the reliability of the triggering. In embodiments where the action utilizes the captured images, utilization of low-quality images is avoided.

In some embodiments, computing the stability parameter includes:
  detecting image positions of one or more predetermined facial features in a plurality of the captured images;
  tracking the one or more predetermined facial features across two or more of the plurality of captured images;
  computing a measure of a degree of movement, in particular a speed of movement, of the one or more facial features within a field of view of the camera.

Accordingly, the stability parameter may efficiently and reliably be computed based on outputs readily available from some embodiments of the detection of facial features.

In particular, the image positions may be two-dimensional (2D) image positions, e.g. positions defined in a 2D coordinate system defining pixel positions of the 2D image, e.g. as expressed as (x,y)-coordinates. The speed of movement of the one or more facial features within the field of view of the camera may be determined as the relative displacement of the corresponding image feature in the 2D image coordinate system in consecutive images of the sequence of images.

The sequence of images may be a sequence of frames of a video stream captured at a certain frame rate. The speed of movement may thus be expressed as the displacement of the facial feature between two consecutive images of the sequences, optionally multiplied by the frame rate at which the sequence of images has been captured.

In some embodiments, the predetermined stability condition is fulfilled if the estimated speed of movement is smaller than a threshold speed.

In some embodiments, computing the stability parameter from a degree of movement of the one or more facial features comprises computing a combined image position as a weighted sum of the detected image positions and computing a degree of movement of the combined image position within the field of view of the camera. Accordingly, the computation of the stability parameter is robust against inaccuracies of the detection of positions of individual features, while still being computationally efficient, as only a single combined feature needs to be tracked. In particular, the stability parameter may efficiently be computed by applying a position-velocity Kalman Filter for tracking the combined image position across the plurality of images. The tracked facial features may include one or more of the plurality of facial features used for the computation of the probability that the first image depicts a predetermined first side of a human head, in particular one or more of the first, second and third facial features. Alternatively or additionally, the tracked facial features may include facial features different from the facial features used for the computation of the probability that the first image depicts a predetermined first side of a human head, in particular different from the first, second and third facial features.

In some embodiments, the camera is a monocular camera. It will be appreciated, however, that the camera may also be a multi-ocular camera, even though at least some embodiments of the apparatus and method disclosed herein do not rely on depth information or otherwise on multi-ocular image information. Moreover, at least some embodiments of the apparatus and process disclosed herein does not rely on detailed knowledge of camera parameters, and the process may be performed for a wide variety of different types of cameras, even without need for complicated tuning of the process.

The camera may be a digital camera, such as a webcam.

The camera and the processing unit may be provided as separate devices, each having its own housing. In such embodiments, the camera may be communicatively coupled to the processing unit via a wired or a wireless connection, e.g., via a wired USB connection, via Bluetooth or another short-range wireless connection. The connection may be a direct or indirect connection, e.g., a connection via one or more intermediary nodes of a communications network. In other embodiments, the camera and the processing unit may be integrated into a single device. In particular, the camera and the processing unit may be accommodated into the same housing. For example, the digital camera may be integrated into a data processing device such as into a tablet computer, a laptop computer, a mobile phone or the like. The processing unit may be a processing unit, such as a central processing unit of the data processing device.

For the purpose of the present description, the term "processing unit" comprises any suitably configured circuitry or device configured to perform the processing described herein to be performed by the processing unit. For example, the processing unit may be or comprise an ASIC processor, a FPGA processor, a suitably programmed general-purpose processor, a microprocessor, a circuit component, or an integrated circuit. The apparatus may further comprise a memory unit and/or a communications interface respectively connected to the processing unit. The memory unit may include one or more removable and/or non-removable data storage units including, but not limited to, Read Only Memory (ROM), Random Access Memory (RAM), etc. The memory unit may have a user application stored thereon, the user application comprising program code for causing the processing unit to perform acts of the method described herein.

The apparatus may include or be embodied as a portable device such as a portable communications device, e.g., a smartphone, a smartwatch, a tablet computer or another portable processing device or system. In particular, the apparatus may be a portable device that includes a digital camera or the apparatus may include a portable device and a separate digital camera where the portable device and the camera include respective wireless or wired communications interfaces for communicating data, in particular captured images and/or camera control data, between the portable device and the digital camera.

The present disclosure relates to different aspects including the apparatus described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein are embodiments of a computer-implemented method for triggering performance of a head-pose dependent action, the method comprising:
  receiving from a camera, a sequence of captured images;
  processing a first image of the received sequence of images to detect respective likelihoods of each of at least three predetermined facial features being visible in the first image;
  computing, from the computed likelihoods, a probability that the first image depicts a predetermined first side of a human head;
  responsive to at least the computed probability exceeding the predetermined detection probability, triggering performance of the head-pose dependent action.

According to yet another aspect, disclosed herein are embodiments of a computer program product, in particular a user application, configured to cause, when executed by a processing unit, the processing unit to perform the acts of the method described above and in the following. The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network, or an application for download to a portable device from an App store.

Various embodiments of the apparatus and method described herein may trigger different types of actions responsive to the computed probability exceeding the predetermined detection probability and the computed stability parameter fulfilling the predetermined stability condition. In particular, in some embodiments, performing the predetermined action comprises performing one or more actions chosen from: recording at least one of the sequence of captured images as an image of the first side of a human head, capturing at least one image and recording said captured image as an image of the first side of a human head. Accordingly, the apparatus and method allow an automatic capturing and/or recording of one or more images of a side of the human head. For example, such head-pose dependent recording of images may be useful in a variety of applications. For example, when accumulating a training dataset for ear detection using a machine learning algorithm, such as an artificial neural network (NN), typically a large number of images need to be recorded that show a human ear. Embodiments of the apparatus and method disclosed herein provide an efficient and reliable method for capturing large numbers of suitable images while ensuring at least a minimum quality of the recorded images. For example, the images may subsequently be processed further, e.g. so as to annotate the ear location in the image. Another example application of the apparatus and method disclosed herein includes the triggering of image capture to produce an input for ear detection algorithms within a hearing aid self-fitting procedure.

DETAILED DESCRIPTION

Figure 1:
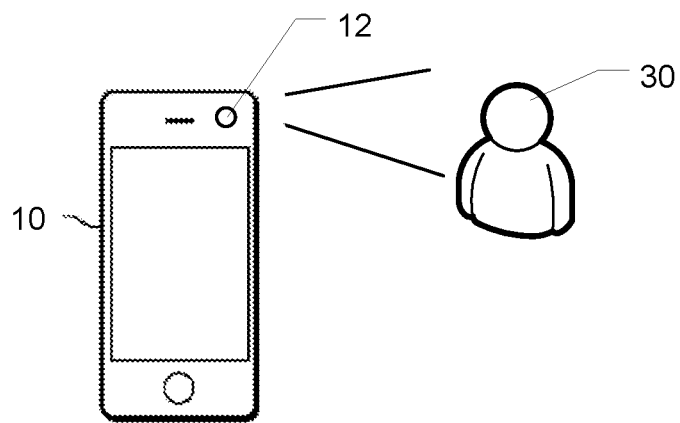
FIG. 1 schematically shows an example of an apparatus for triggering performance of a head-pose dependent action.

FIG. 1 schematically shows an example of an apparatus 10 for triggering performance of a head-pose dependent action, i.e. an action triggered by a predetermined pose of a human head 30. In the example of FIG. 1, the apparatus 10 is a portable device, in particular a smartphone, having an integrated digital camera 12. For example, the camera 12 may be a front facing camera of the smartphone. However, in other embodiments, the camera may be a rear-facing camera. It will further be appreciated that, in other embodiments, the portable device 10 may be a tablet computer, a laptop computer or another type of portable processing device having an integrated digital camera. The portable device 10 comprises a processing unit (not explicitly shown in FIG. 1), such as a suitable programmed central processing unit. The processing unit is programmed or otherwise configured to:
  receive a sequence of images captured by the digital camera 12;
  process a first image of the received sequence of images to compute respective likelihoods of each of at least three predetermined facial features being visible in the first image;
  compute, from the detected likelihoods, a probability that the first image depicts a predetermined first side of a human head 30;
  process one or more images of the sequence of images to compute a stability parameter indicative of a stability of the captured images over time;
  determine whether the computed probability exceeds a predetermined detection probability and whether the computed stability parameter fulfills a predetermined stability condition;
  responsive to the computed probability exceeding the predetermined detection probability and the computed stability parameter fulfilling the predetermined stability condition, triggering performance of a predetermined head-pose dependent action, e.g., the capturing of an image or the recording of one of the already captured images as an image of the first side of the human head 30.

For example, the processing unit may be configured to perform the acts of the method described in detail below in connection with FIG. 3.

Figure 2:
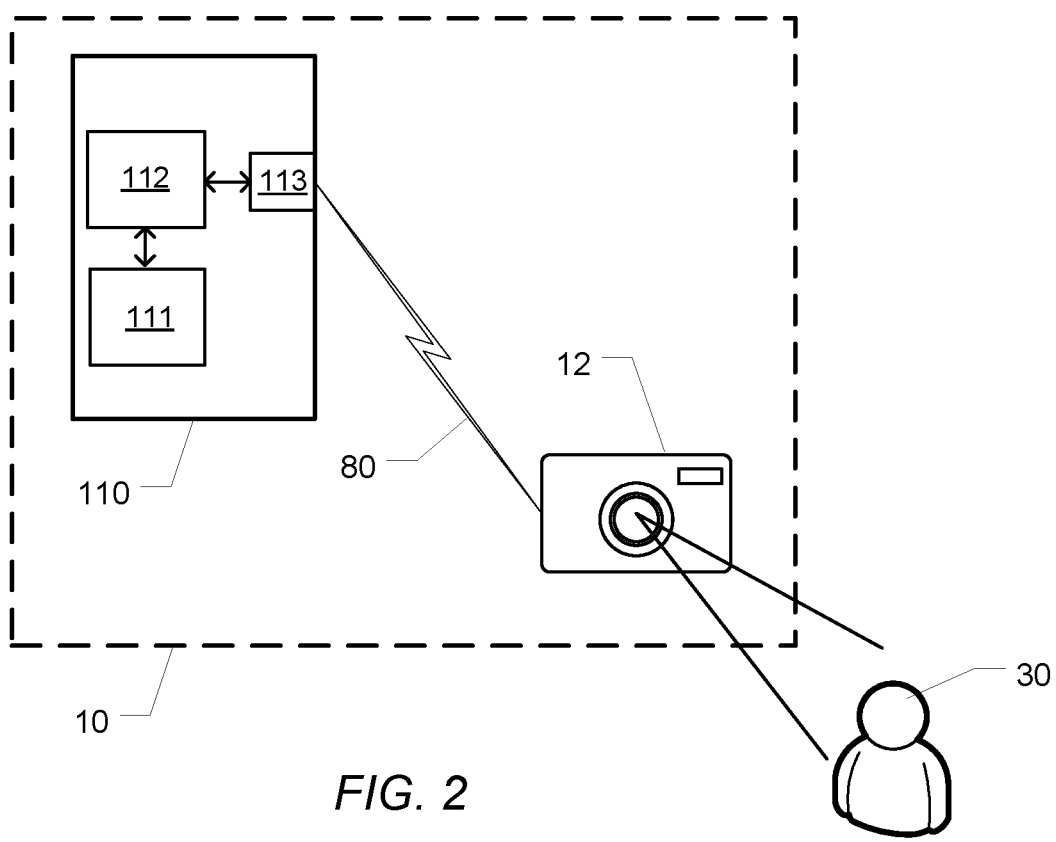
FIG. 2 schematically shows another example of an apparatus for triggering performance of a head-pose dependent action.

FIG. 2 schematically shows another example of an apparatus 10 for triggering performance of a head-pose dependent action. The apparatus 10 of FIG. 2 is similar to the apparatus of FIG. 1 in that the apparatus 10 includes a digital camera 12 and a processing unit 112 configured to perform the acts as described in connection with FIG. 1. The apparatus of FIG. 2 differs from the apparatus of FIG. 1 in that the apparatus 10 of FIG. 2 comprises two distinct and separate devices, each having its own housing. In particular, the apparatus of FIG. 2 includes a data processing device 110 and the digital camera 12 separate from and external to the data processing device 110.

The digital camera 12 may be a webcam or another type of digital camera communicatively coupled to the data processing device 110 and operable to capture images of a human head 30. In the example of FIG. 2, the digital camera 12 is communicatively coupled to the data processing device 110 via a short-range wireless communications link 80. The short-range wireless communications link 80 may be a radio communications link, e.g., Bluetooth communication slink or a wireless communications link using another suitable wireless communications technology. In other examples, the digital camera 12 is communicatively coupled to the data processing device 110 via a different type of wired or wireless communications link. Examples of a different type of wireless communications link include an indirect link, e.g., via a wireless access point, via a local wireless computer network or the like. Yet further, examples of a wired communications link include direct or indirect wired connections, e.g., via a USB cable, a wired local area network, or another suitable wired communication technology.

The data processing device 110 comprises the processing unit 112, a memory 111 and a communications interface 113. The processing unit 112 may be a suitable programmed central processing unit. The processing unit 112 is operationally coupled to the memory 111 and the communications interface 113. The memory 111 may be configured to store a computer program to be executed by the processing unit 112. Alternatively or additionally, the memory 111 may be configured to store recorded images captured by, and received from, the digital camera 12. The communications interface 113 comprises circuitry for communicating with the digital camera 12. In the example of FIG. 12, the communications interface includes a transceiver for wirelessly communicating with a corresponding transceiver of the digital camera 12. In other embodiments, e.g., when the camera communicates with the data processing device using a wired connection, the communications interface 113 may include alternative or additional circuitry, e.g., a USB port or another suitable interface for wired communication.

While the data processing device 110 of the example of FIG. 2 and the portable device 10 of FIG. 1 each are shown as a single device, it will be appreciated that other examples may include a distributed data processing device, e.g., a data processing system including multiple computers or other processing devices. In such distributed embodiment, the camera may be integrated into one of the computers or other processing devices or be embodied as a separate entity.

Figure 3:
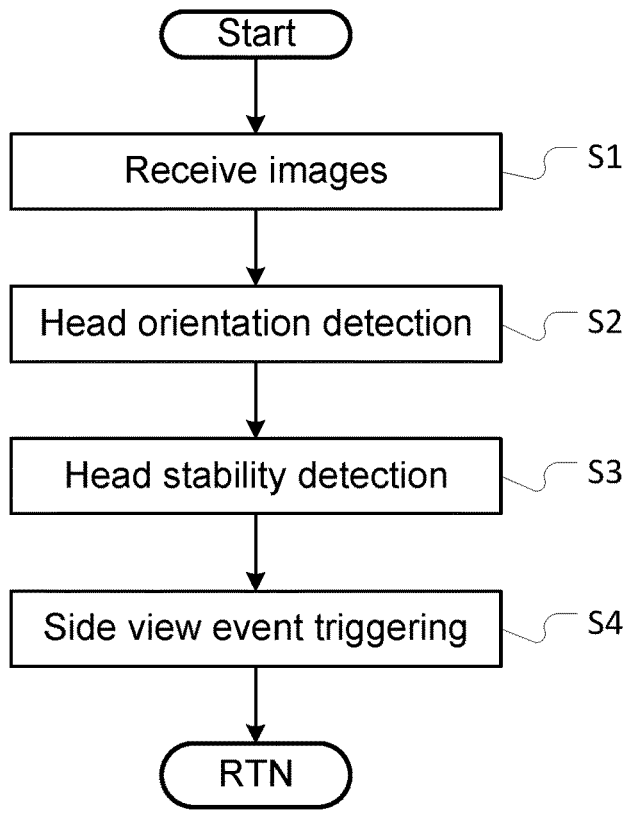
FIG. 3 schematically shows an example of a method for triggering performance of a head-pose dependent action.

FIG. 3 schematically shows an example of a method for triggering performance of a head-pose dependent action.

The method may e.g., be performed by the apparatus of any of FIGS. 1-2 or by another suitable apparatus.

At initial step S1, the process receives one or more captured images depicting a human head. The subsequent steps S2-S4 may be performed in real-time or quasi-real time, i.e., the individual images, e.g., individual frames of video, may be processed as they are received rather than waiting for an entire plurality of images having been received. In other examples, the process may receive a certain number of images, e.g., a certain number of frames, and then process the number of images by performing steps S2-S4.

In subsequent step S2, the process processes the one or more captured images to detect an orientation of the depicted head relative to the camera having captured the image(s). In particular, this step may detect whether a predetermined lateral side view of a human head is depicted in the image. Accordingly, this step may output a corresponding lateral side view detection condition $C_{side}=\{\text{true, false}\}$, e.g., a left side detection condition $C_{right}=\{\text{true, false}\}$ and/or a right side detection condition $C_{left}=\{\text{true, false}\}$. At least some embodiments of this step may be based on detected facial landmarks. An example of a process for detecting the orientation of the head will be described below in more detail with reference to FIG. 4.

In subsequent step S3, the process processes one or a sequence of the captured images depicting the human head to determine whether the captured image or the sequence of the captured images depict the human head in a sufficiently stable manner, i.e., whether a predetermined stability condition is fulfilled. The stability detection ensures that an action is only triggered if the images are sufficiently stable. For example, when the action to be triggered involves utilizing the captured images or capturing new images, the stability detection reduces the risk of out-of-focus pictures being taken. The stability detection may e.g., detect relative movement of the depicted head relative to the camera. The stability detection may output a stability condition parameter $C_{stable}=\{\text{true, false}\}$ indicative of whether a stability condition is fulfilled or not, e.g., whether detected relative movement of the depicted head is sufficiently small, e.g., smaller than a predetermined threshold. Various methods for stability detection may be used:

For example, the stability detection may be based on the processing of raw video frames. Examples of such processing include an analysis of edges and gradients in the received images, as in-focus images tend to have visual features with sharp edges and stronger color gradients. Another example of a stability detection based on the processing of raw video frames may involve an image histogram analysis, as the form of histograms tend to differ for out-of-focus and in-focus images.

Another example of stability detection utilizes detected landmarks, thus allowing reuse of results from the orientation detection. In particular, the stability detection may be based on a tracking of individual landmarks and/or tracking of a combination, e.g., a linear combination, of multiple landmarks across a sequence of images. The tracking of landmarks allows the computation of a statistical position deviation, based on which a stability criterion may be determined. An example of such a process will be described in more detail below with reference to FIG. 6.

If the process detects that, with sufficiently high probability, the images depict the predetermined lateral side view of the human head and that the stability condition is fulfilled, the process proceeds at step S4; otherwise, the process terminates or returns to step S1.

Accordingly, in step S4, the process triggers a predetermined action, responsive to the side view detection condition and the stability condition being fulfilled. If the event is to be triggered by a detected left side view, the triggering condition is $C_{left} \wedge C_{stable}$. Similarly, if the event is to be triggered by a detected right side view, the triggering condition is $C_{right} \wedge C_{stable}$. If the event is to be triggered by any detected lateral side view, e.g., by both left and right side views, the triggering condition is $(C_{right} \vee C_{left}) \wedge C_{stable}$.

The predetermined action may include capturing one or more further images or recording one or more of the captured images as one or more images depicting a lateral side view of the human head.

Figure 4:
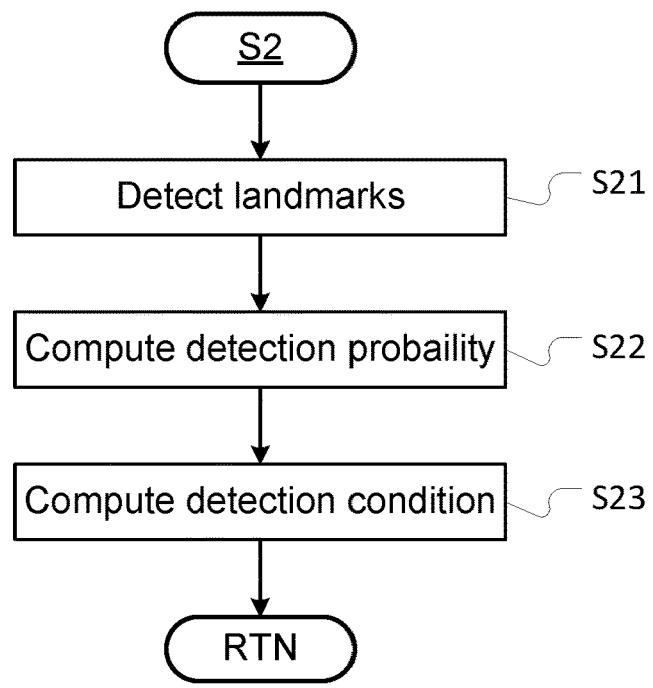
FIG. 4 schematically illustrates an example of a process for detecting a predetermined lateral side view of a human head depicted in an image.

FIG. 4 schematically illustrates an example of a process for detecting a predetermined lateral side view of a human head depicted in an image, e.g., an example of step S2 of FIG. 3.

In initial step S21, the process detects one or more facial landmarks (also referred to as landmarks, landmark points or keypoints) in the image. The landmark detection may be performed using any suitable detection method known as such in the art, e.g., by a commercially available pose estimation library, such as PoseNet or OpenPose.

The detection process may be configured to detect a plurality of predetermined facial landmarks. An example of such landmarks are illustrated in FIGS. 5A-5D.

Figure 5A:
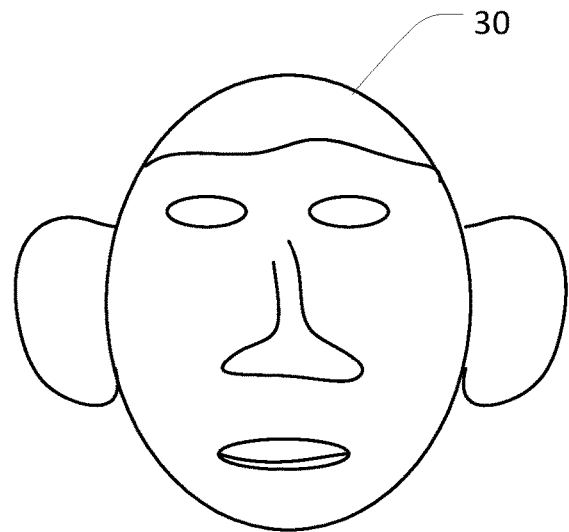
FIGS. 5A-D schematically illustrate examples of facial landmarks.

In particular, FIG. 5A shows an example of a 2D image of a human head 30.

Figure 5B:
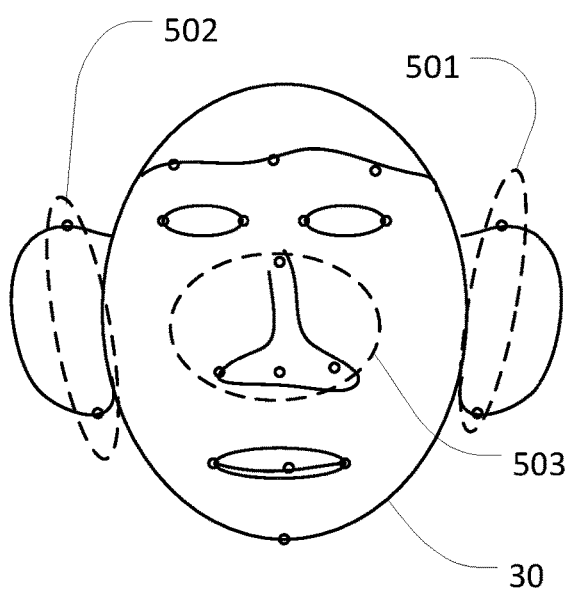

FIG. 5B shows the 2D image of the human head 30 of FIG. 5A with a set of predetermined facial landmarks indicated as circles. The facial landmarks are indicative of predetermined facial features, in particular anatomical features, of the human head, such as predetermined features of the left and right eyes, the nose, the mouth, the hairline, the chin and the left and right ears. It will be appreciated that other embodiments may detect fewer or more features and/or alternative or additional features. In some embodiments, the process particularly utilizes facial landmarks associated with a selected subset of facial features. In particular, facial landmarks associated with the left and right ears and the nose have been found to provide a reliable detection of a lateral side view of a human head. In the example of FIG. 5B, the selected facial landmarks include a first group of facial landmarks, indicated by dashed line 501, associated with the left ear of the human head (relative to the viewing direction of the head itself). The selected facial landmarks further include a second group of facial landmarks, indicated by dashed line 502, associated with the right ear of the human head. The selected facial landmarks further include a third group of facial landmarks, indicated by dashed line 503, associated with the nose of the human head.

Figure 5C:
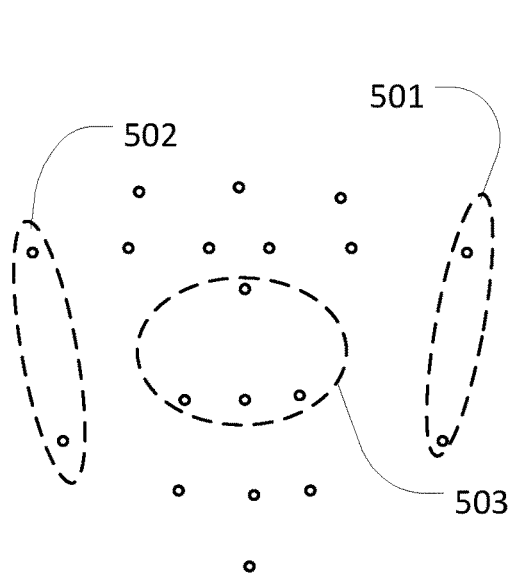

FIG. 5C shows only the detected facial features of FIG. 5B at their detected image positions but where the underlying image of the human head has been omitted.

Figure 5D:
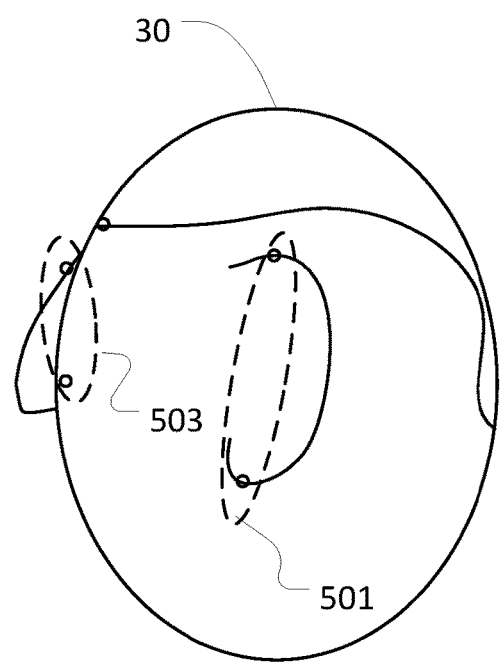

FIG. 5D shows an image of the same human head 30 as illustrated in FIGS. 5A and 5B, but taken from a different viewpoint relative to the head. In particular, FIG. 5D shows a lateral side view of the human head 30 seen from the left side of the human head. As in FIG. 5B, the facial landmarks visible in this view of the human head are indicated by circles, in particular the groups 501 and 503 of facial landmarks associated with the left ear and the nose, respectively. The second group of 502 of facial landmarks is not visible in this view of the human head.

The process for detecting the facial landmarks may result in a list, array or other suitable data structure of detected facial landmarks. The list may include, for each detected landmark, a landmark identifier, 2D image coordinates indicating the position in the image where the landmark has been detected, and a confidence value. The landmark identifier may be indicative of which of the predetermined facial landmarks has been detected, e.g., the left corner of the right eye, etc. It will be appreciated that the landmark identifiers may be chosen in any suitable manner, e.g., a landmark name or other descriptor, a landmark serial number, etc. as long as the identifiers allow the different landmarks to be distinguished from another. The 2D image coordinates indicate the 2D image position of the detected landmark in the image, e.g., as expressed in (x, y) pixel coordinates. The confidence value may be a value between 0 and 1 indicative of the confidence with which the landmark has been detected, where a confidence level of 1 may correspond to absolute certainty. The confidence level may also be referred to as a confidence score or simply score. It can be interpreted as a probability that the landmark is visible.

Most landmark detection algorithms produce numerous facial landmarks related to different features of a human face. At least some embodiments of the process disclosed herein only use information about selected, predetermined facial landmarks as an input for the detection of the orientation of the head depicted in the image. In particular, in order to detect a lateral side view of the human head, the process may utilize three groups of landmark features as schematically illustrated in FIG. 5B, i.e., a first group 501 of facial landmarks associated with the left ear of the human head, a second group 502 of facial landmarks associated with the right ear of the human head and a third group 503 of facial landmarks associated with the nose of the human head.

It will be appreciated that each of the groups of landmarks may include a single landmark or multiple landmarks. The groups may include equal numbers of landmarks or different numbers of landmarks. For each group of landmarks, the process may determine a representative image position, e.g., as a geometric center of the detected individual landmarks of the group or another aggregate position. Similarly, the process may determine an aggregate confidence level of the group of landmarks having been detected, e.g., as a product, average or other combination of the individual landmark confidence levels of the respective landmarks of the group.

An example of an input to the detection process is illustrated in the table below:

| Landmark Group Name | Position | Confidence |
|---|---|---|
| Group 1: Left ear-related landmarks | $x_1, y_1$ | $0 \le c_1 \le 1$ |
| Group 2: Right ear-related landmarks | $x_2, y_2$ | $0 \le c_2 < 1$ |
| Group 3: Nose-related landmarks | $x_3, y_3$ | $0 \le c_3 < 1$ |

This format is supported by OpenPose (see https://github.com/CMU-Perceptual-Computing-Lab/openpose) and PoseNet (see https://github.com/tensorflow/tfjs-models/tree/master/posenet) libraries.

Again referring to FIG. 4, in subsequent step S22, based on the detected landmarks, e.g. based on the detected ones of the selected groups of landmarks, the process determines one or more probabilities of the image depicting respective one or more predetermined lateral side views, namely the lateral side views that are intended to trigger an action. For the purpose of the present example, it will be assumed that the predetermined lateral side view, which is intended to trigger an action, is a left side view, i.e., a side view from a viewing point facing the left side of the human head.

A robust and efficient measure of the probability $P_{left}$ that an image depicts a left lateral side view of a human head may be computed from the above three groups of landmarks associated with the ears and the nose, e.g., as follows:

$$P_{left} = c_1(1-c_2)c_3$$

It will be appreciated that, if the side view detection is based on other landmarks, the probability of the image depicting a certain side view may be computed in a similar manner, depending on whether the corresponding landmarks are visible from the respective side or not.

In subsequent step S23, the process determines whether the predetermined lateral side view has been detected with sufficiently high probability, e.g., by comparing the computed probability with a predetermined threshold:

$$C_{left} = \begin{cases} \text{true} & \text{if } P_{left} \ge P_{side} \\ \text{false} & \text{otherwise} \end{cases},$$

Where $0 \le P_{side} \le 1$ is the predetermined threshold and $C_{left}$ represents a left side view detection condition. The left side view detection condition has the logical value "true", if the left side view has been detected with sufficiently high probability, and the logical value "false" otherwise.

It will be appreciated that other embodiments of the process may detect a different lateral side view or multiple side views. For example, a probability $P_{right}$ that an image depicts a right lateral side view of a human head may be computed as:

$$P_{right} = c_2(1-c_1)c_3.$$

A corresponding right side detection condition $C_{right}$ may be computed as:

$$C_{right} = \begin{cases} \text{true} & \text{if } P_{right} \ge P_{side} \\ \text{false} & \text{otherwise} \end{cases},$$

Accordingly, embodiments of the process may compute $P_{left}$ and/or $P_{right}$, depending on whether only one of the lateral side views is intended to trigger and action or whether both lateral side views are intended to trigger and action.

The process then returns the computed lateral side view detection condition or conditions.

Figure 6:
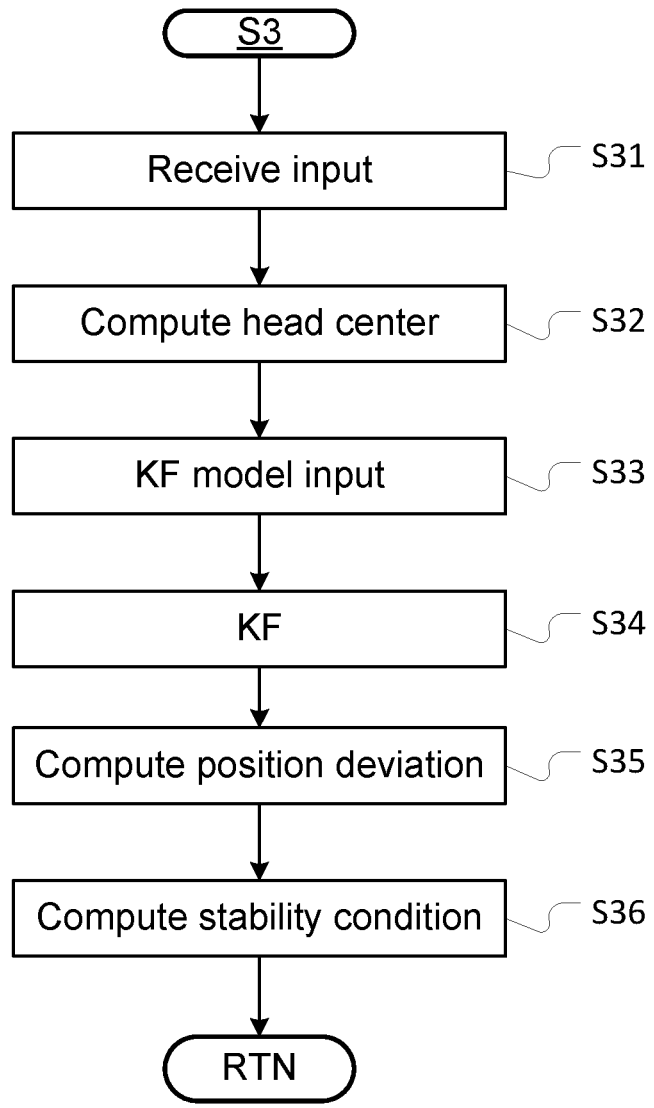
FIG. 6 schematically illustrates a process for detecting whether a human head is depicted in a sequence of images in a sufficiently stable manner.

FIG. 6 schematically illustrates a process for detecting whether a human head is depicted in a sequence of images, in particular in a sequence of video frames, in a sufficiently stable manner. The process of FIG. 6 is a possible implementation of step S3 of FIG. 3.

In initial step S31, the process receives a sequence of input data sets associated with a corresponding sequence of video frames. The sequence of video frames having been captured at a certain frame rate, measured as frames per second (FSP). The input data may include the actual video frames. In that case, for each video frame, the process performs landmark detection, e.g., as described in connection with step S21 of the side view detection process of FIG. 4. However, it will be appreciated that the stability detection process may reuse any detected landmark coordinates that have already been detected in a video frame as part of the side view detection. Accordingly, instead of, or in addition to, receiving the video frames, the stability detection process may receive a sequence of landmark data sets as its input. Each landmark data set includes information about the detected landmarks in an image, e.g., in a video frame. For each detected landmark, the information includes the 2D image coordinates of the detected landmark and the associated confidence level or score.

In subsequent step S32, the process computes a weighted sum of the image coordinates of the detected landmarks:

$$z = \frac{\sum_{i=1}^{N} c_i z_i}{\sum_{i=1}^{N} c_i}$$

where $z_i$ is a coordinate vector associated with i-th landmark and z is the weighted sum of landmark positions, each landmark coordinate vector being weighted by its detection confidence level $c_i$. The weighted sum z may be considered as a generalized head center. N is the number of landmarks. It will be appreciated that the stability detection may be performed based on all detected landmarks or only based on a subset of the detected landmarks, e.g., the landmarks selected for the side view detection, as described in connection with step S21 of the side view detection process of FIG. 4. It will further be appreciated that the process may be based on a different combination of landmark positions of all or of a selected subset of the detected landmarks.

In subsequent step S33 the process computes model input parameters for a position-velocity Kalman Filter configured to track the generalized head center. In particular, the process defines a state vector, an associated evolution equation and a measurement equation.

To this end, the process defines a state vector $x=[x\ y\ x'\ y']^T$ where $[x,y]^T=z$ represent the current position of the generalized head center and $[x',y']^T=z'$ represents a 2D velocity of the generalized head center.

The process further defines an evolution equation for use by the Kalman filter:

$$x = Fx_{prev} + w,$$

Where F denotes a transition matrix:

$$F = \begin{bmatrix} 1 & 0 & \Delta T & 0 \\ 0 & 1 & 0 & \Delta T \\ 0 & 0 & 1 & 0 \\ 0 & 0 & 0 & 1 \end{bmatrix}.$$

In the evolution equation, x is related to the current video frame while $x_{prev}$ is related to the preceding video frame, i.e., the video frame processed during the preceding iteration of the process. $\Delta T=1/FPS$ is the reciprocal of the frame rate FPS (frames per second). The evolution equation further includes a process noise term w, which may be drawn from a zero mean multivariate normal distribution with covariance Q, i.e. $w \sim N(0,Q)$. The covariance Q may be a diagonal matrix with suitable predetermined values.

The process may define the measurement equation as:

$$z = Hx + v,$$

Where H denotes the measurement matrix $$H = \begin{bmatrix} 1 & 0 & 0 & 0 \\ 0 & 1 & 0 & 0 \end{bmatrix},$$

and v denotes observation noise, which may be drawn from a zero mean multivariate normal distribution with suitably selected diagonal covariance R, i.e. $v \sim N(0,R)$.

In step S34, the process performs an iteration of a Kalman-Filter, known as such in the art (see e.g., https://en.wikipedia.org/wiki/Kalman_filter), using the above evolution and measurement equations.

In step S35, the process computes a position deviation measure from the Kalman-filtered state vector x. In particular, the filtered state vector x includes the 2D velocity $z'=[x',y']^T$ and the process computes a norm, e.g. a Euclidean norm, $\|z'\|$ of the 2D velocity and uses it as a stability parameter.

In step S36, the process determines whether the computed stability parameter fulfills a predetermined stability criterion, e.g., by comparing the computed stability parameter with a predetermined threshold:

$$C_{stable} = \begin{cases} \text{true} & \text{if } \|z'\| \leq z'_{stable} \\ \text{false} & \text{otherwise} \end{cases},$$

Where $z'_{stable} > 0$ is the predetermined threshold and $C_{stable}$ represents the stability condition. The stability condition has the logical value "true", if the stability parameter, i.e., the position deviation, is smaller than the threshold; otherwise, the stability condition has the logical value "false."

The process then returns the computed stability condition $C_{stable}$.

The process described above thus provides a robust and efficient triggering of a head-pose dependent action in real time that can be implemented on desktop, mobile and web computing environments. It has relatively low computational cost due to simplicity of the operations performed on top of landmarks detection for each frame. It is also adaptive to different camera frame rates and can easily be adapted/tuned by means of few tuning parameters, namely the thresholds $P_{side}$ and $z'_{stable}$.

Although the above embodiments have mainly been described with reference to certain specific examples, various modifications thereof will be apparent to those skilled in art without departing from the spirit and scope of the invention as outlined in claims appended hereto.

The invention claimed is:

1. An apparatus comprising a camera and a processing unit operatively coupled to the camera, wherein the processing unit is configured to:
   receive a sequence of images provided by the camera;
   process a first image of the sequence of images to compute likelihood(s) of facial feature(s) being visible in the first image;
   compute a probability of the first image depicting a first lateral side of a human head of a person based on the computed likelihood(s); and
   trigger a performance of an image-recording of the human head of the person if the computed probability of the first image depicting the first lateral side of the human head exceeds a predetermined detection probability, wherein the performance of the image-recording is automatic in response to the probability of the first image depicting the first lateral side of the human head exceeding the predetermined detection probability while the person is looking away from the apparatus.

2. An apparatus comprising a camera and a processing unit operatively coupled to the camera, wherein the processing unit is configured to:

receive a sequence of images provided by the camera, the sequence of images comprising a first image;

determine a probability of the first image depicting a first lateral side of a human head;

compute a stability parameter indicative of a stability of at least some of the images over time;

determine whether the computed stability parameter fulfills a predetermined stability condition; and trigger a performance of (1) an image recording, (2) a hearing-aid fitting process, or (3) an ear-image detection, if the computed probability of the first image depicting the first lateral side of the human head exceeds the predetermined detection probability, and if the computed stability parameter fulfills the predetermined stability condition, wherein the performance of the image recording, the hearing-aid fitting process, or the ear-image detection is automatic in response to the probability of the first image depicting the first lateral side of the human head exceeding the predetermined detection probability, and in response to the computed stability parameter fulfilling the predetermined stability condition.

3. The apparatus according to claim 2, wherein the processing unit is configured to compute the stability parameter by:
  tracking at least one of the facial feature(s) across two or more of the images, and
  computing a metric associated with a movement of the at least one of the facial feature(s) within a field of view of the camera.

4. The apparatus according to claim 3, wherein the predetermined stability condition is fulfilled if the metric is smaller than a threshold.

5. The apparatus according to claim 3, wherein the processing unit is configured to compute the stability parameter by determining a weighted sum of image positions of the at least one of the facial feature(s) in the two or more of the images to obtain a combined image position.

6. The apparatus according to claim 5, wherein the processing unit is configured to compute the stability parameter by applying a position-velocity Kalman Filter to track the combined image position.

7. The apparatus according to claim 3, wherein the metric is associated with a degree of movement.

8. The apparatus according to claim 3, wherein the metric is associated with a speed of movement.

9. The apparatus according to claim 1, wherein the camera is a monocular camera.

10. The apparatus according to claim 1, wherein the facial feature(s) comprise multiple facial features.

11. The apparatus according to claim 10, wherein the multiple facial features comprise:
  a first facial feature of the first lateral side of the human head,
  a second facial feature of a second lateral side of the human head, the second lateral side being opposite the first lateral side, and
  a third facial feature of a front side of the human head.

12. The apparatus according to claim 11, wherein the first facial feature is indicative of a first ear.

13. The apparatus according to claim 11, wherein the third facial feature is indicative of a nose.

14. The apparatus according to claim 1, wherein the image-recording comprises a recording of at least one of the images in the sequence as an image of the first lateral side of the human head.

15. The apparatus according to claim 1, wherein the image-recording comprises a recording of the first image.

16. A computer-implemented method for triggering an action, the method comprising:
  receiving from a camera, a sequence of images;
  processing a first image of the sequence of images to determine likelihood(s) of facial feature(s) being visible in the first image;
  computing a probability of the first image depicts a first lateral side of a human head based on the determined likelihood(s); and
  triggering a performance of an image recording or an image processing;
  wherein the act of triggering the performance of the image recording or the image processing comprises utilizing a trigger that comprises information regarding the computed probability of the first image depicting the first lateral side of the human head exceeding the predetermined detection probability, and wherein the performance of the image recording or the image processing is automatic in response to the probability of the first image depicting the first lateral side of the human head exceeding the predetermined detection probability.

17. A computer-implemented method for triggering an action, the method comprising:
  receiving from a camera, a sequence of images comprising a first image;
  determining a probability of the first image depicting a first lateral side of a human head based on the determined likelihood(s);
  computing a stability parameter indicative of a stability of at least some of the images over time;
  determining whether the computed stability parameter fulfills a predetermined stability condition; and
  triggering a performance of (1) an image recording, (2) a hearing-aid fitting process, or (3) an ear-image detection, if the computed probability of the first image depicting the first lateral side of the human head exceeds the predetermined detection probability, and if the computed stability parameter fulfills the predetermined stability condition, and wherein the performance of the image recording, the hearing-aid fitting process, or the ear-image detection is automatic in response to the probability of the first image depicting the first lateral side of the human head exceeding the predetermined detection probability, and in response to the computed stability parameter fulfilling the predetermined stability condition.

18. The computer-implemented method according to claim 16, wherein the image-recording comprises a recording of an image of the first lateral side of the human head as a training image for a machine-learning process.

19. The apparatus according to claim 1, wherein the processing unit is configured to trigger the performance of the image-recording by utilizing an image-capturing trigger that comprises information regarding the computed probability of the first image depicting the first lateral side of the human head exceeding the predetermined detection probability.

20. The computer-implemented method according to claim 17, wherein the act of triggering comprises utilizing a trigger that comprises information regarding the computed probability of the first image depicting the first lateral side of the human head exceeding the predetermined detection probability.

* * * * *